(12) United States Patent
Barclay

(10) Patent No.: US 6,704,732 B1
(45) Date of Patent: Mar. 9, 2004

(54) WEBSITE USAGE MONITORING

(75) Inventor: Iain Stuart Barclay, Chepstow (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 09/490,784

(22) Filed: Jan. 24, 2000

(65) Prior Publication Data (65)

(30) Foreign Application Priority Data

Jan. 29, 1999 (GB) .............................................. 9901857

(51) Int. Cl.7 ........................ G06F 17/30; G06F 15/173
(52) U.S. Cl. ......................................... 707/10; 709/224
(58) Field of Search .............................. 707/1–2, 6–7, 707/10, 100–104, 200–205, 509, 526; 709/200–207, 216–252; 345/418, 594, 650, 661; 715/500.1, 501.1, 511–514, 526–527; 705/22

(56) References Cited

U.S. PATENT DOCUMENTS

| | | | | |
|---|---|---|---|---|
| 6,182,133 B1 | * | 1/2001 | Horvitz | 707/8 |
| 6,332,135 B1 | * | 12/2001 | Conklin et al. | 705/80 |
| 6,341,310 B1 | * | 1/2002 | Leshem et al. | 709/223 |

FOREIGN PATENT DOCUMENTS

| | | |
|---|---|---|
| EP | 0 909 082 | 4/1999 |
| WO | WO 97/26729 | 7/1997 |
| WO | WO 98/26571 | 6/1998 |

OTHER PUBLICATIONS

"Open Door Networks Brings Affordable Real–Time Monitoring To Windows Web Servers," LogDoor Web Site Monitor, press release at www2.opendoor.com/logdoor/windows/ldwships.htm (Jun. 1997).

Broida, "WebXRay," *Computer Shopper*, wysiwyg://29http://www.zdnet.com/products/content/cshp/1708/cshp0188/htm (Aug. 1997).

Broida, "Internet Snapshot," *Computer Shopper*, wysiwyg://30/http://www.zdnet.com/products/content/cshp/1708/cshp0186.htm (Aug. 1997).

"Hit List;" Product descriptions of Hit List Pro 4.0, Hit List Commerce 4.0, Hit List Enterprise 4.0, Hit List Live 4.0, and Plug–Ins; Marketwave Corporation (1998).

"The LogDoor Real–time Server Monitor," Web Page, Open Door Networks, Inc., 2 pages, (1996–1998) attached to the following sites: LogDoor User's Guide: Detailed Site Information, 3 pages; LogDoor User's Guide: LogDoor Tasks, 7 pages; "Open Door Networks Announces LogDoor 2.0," LogDoor 2.0 Press Release (Jan. 1998).

* cited by examiner

Primary Examiner—Alford Kindred

(57) ABSTRACT

A website is monitored to determine for each of the current web clients currently visiting the site, whether the client is currently located at one of a set of monitored entities of the site. This set of monitored entities may simply be every page of the site. The determination;of whether a client is currently located at a monitored entity is done, for example, by maintaining a database listing all current clients and holding, for each client, a list of the last preceding files requested by the client and the time of the last file request. The database is then periodically interrogated to ascertain for each client whether it is currently at a monitored entity, this information then being used to generate an output indicative of the current distribution of clients across the monitored entities.

14 Claims, 4 Drawing Sheets

CURRENT VISITORS: ALL PAGES

CURRENT VISITORS: TOP FIVE PAGES

WEBSITE USAGE MONITORING

FIELD OF THE INVENTION

The present invention relates to a method of monitoring the usage of a website to provide an output indicative of a current distribution of clients across monitored entities of the site (for example, across all the pages of the site).

As used herein, the term "website" is to be understood as including any collection of files each downloadable over a network for display at a client machine and between which a user at that client can move by following hyperlinks embedded in the files; in particular, whilst the origin of the term "website" stems from the "worldwide web" application based on the HTML mark-up language and the HTTP protocol, the present invention is not restricted to such specific standards and the term "website" as used herein is to be read more broadly. Furthermore, the present invention can be applied to any website regardless of whether it is an Intranet, extranet or intranet site.

BACKGROUND OF THE INVENTION

FIG. 1 of the accompanying drawings shows a well known arrangement of a website 10 accessible over a network 14 by web clients 13 (typically a web browser running on a PC).

The website 10 is made up of a collection of pages (P1–P6 in the present example) that take the form of HTML files held on a web server 12. Upon a web client 13 requesting a file (identified by its URL) over the network 14 using the HTTP protocol, the server 12 retrieves the file and sends it to the requesting client for display.

The pages making up the website 10 are normally arranged in a hierarchy with the page P1 at the head of this hierarchy being termed the "home page" of the site. In the present case, the home page P1 has links to three "second level" pages P2 to P4, and second-level page P2 has links to two third-level pages P5 and P6. It will be appreciated that this example is very limited in terms of the number of pages and links between pages.

Associated with each HTML page file, there will normally be image files (and increasingly also sound and video files) which will be automatically loaded into the client with the page file. Furthermore, a page may be divided up into a plurality of frames, as defined by a frame definition file, into each of which content files can be independently loaded.

It is well known to collect usage data for a website (such as the website 10 of FIG. 1) by noting each time each individual page of the site is requested (often called a "hit") during the course of a day. Such data may then be analysed to produce basic statistical data such as the number of overall hits on the website by day/month/multiple months, and the number of hits for each page by day/month/multiple months. Collecting addition data associated with each hit (file request) can provide further useful data—for example, noting the origin of each file request permits the identification of the most productive "portal" providing a hyperlink to the website.

Another useful type of information that can be collected is the behaviour and preferences of users. The collection of this type of information requires each requesting client (or associated user) to be identifiable at least during the course of a session of interaction with the website. There are several ways of doing this, one of the most well known being the use of "cookies" that at the request of the website are stored by clients and supplied back to the site with every file request; "cookies" permit the usage of the site by individual clients to be tracked across multiple sessions of interaction. Another method of tracking website usage by individual clients, at least during a single session of interaction, is to attach a client identifier to every URL contained in pages served to each client, the identifier being allocated when the first page request is received during a session of interaction; with this arrangement, the identifier is automatically returned by the client with every file request (the identifier being stripped off the URL path information before the file is retrieved and then added onto every URL in that file as it is downloaded).

Tracking how particular users navigate a site is useful in determining which groups of topics are of common interest to particular groups of users; this is not only of interest for customer behaviour analysis on commercial sites but also permits a degree of predictive serving of files into caches to improve speed of service to the client. Where clients are uniquely identified across multiples sessions (whether by use of cookies, by use of a logon procedure involving user identification, or in some other manner), it is possible to carry out detailed behavioural analyses and to provide a measure of personalised services to the user. By way of example, International Application WO97/26729 describes an automated collaborative filtering application for use with world wide web advertising.

None of the above web-usage monitoring techniques provides a view of what is happening on a website at a particular point in time and it is an object of the present invention to provide such information.

SUMMARY OF THE INVENTION

According one aspect of the present invention, there is provided a method of monitoring the usage of a website having a plurality of monitored entities each constituted by a file downloadable to a web client or by a logical or sequential combination of such files, the method involving the steps of:

(a) associating an identifier with a web client visiting the website which identifier is provided to the site by the web client with each file request from that client;

(b) monitoring which files are requested by web clients visiting the site and storing currency information that indicates or permits a determination of, for each web client, which monitored entity or entities requested by that client are still current, at a particular point in time, for said client in terms of not having been superseded by a files or files subsequently requested by that web client;

(c) generating from said currency information an output indicating, for said particular point in time, a current distribution of web clients across said monitored entities by reference to which of said monitored entities are then current for said clients.

Although step (c) could be carried out off-line, it is likely to be much more use to effect step (c) on-line to produce a continually updated near real-time indication of the current distribution of clients across the monitored entities.

Because the HTTP protocol is a stateless protocol, it is possible for a web client to cease to be interested in a website without the latter being aware that the client has moved on; in this case, it would be incorrect to continue to consider that client as having a current monitored entity on the website. In order to minimise this possible source of error, the "current" status of a monitored entity associated with a particular client is cancelled when the time elapsed since a request from that client has exceeded a predetermined cut-off value. In fact, the website may be provided with an indication that a particular client has ceased to be interested in the site (for example, through a log-off procedure or by ensuring that the site is involved whenever an off-site link is activated from one of its own pages); in such cases, this indication is used to ensure that there are no "current" monitored entities associated with the client concerned.

In one embodiment, the monitored entities are individual files corresponding to respective pages of the website. In this case, the currency information can comprise, for each client, a client data item including an indication of the last preceding page file requested by that client; step (c) then involves determining whether the last preceding page file is a monitored entity.

In another embodiment, at least one monitored entity is defined in terms of a combination of a particular frame-definition file and a predetermined file serving as a source file for a frame defined by the frame-definition file. In this case, the currency information can comprise, for each client, a client data item including a list of the last preceding files requested by that client; step (c) then involves determining from the list whether said at least one monitored entity is current for that client which is taken to be so when both the particular frame definition file and the predetermined file are current.

In a further embodiment, at least one monitored entity is defined in terms of a sequential combination of first and second predetermined files in that order. In this case, the currency information can comprise, for each client, a client data item including a list of the last preceding files requested by that client; step (c) then involves determining from the list whether said at least one monitored entity is current for that client which is taken as being so when the first predetermined file has been superseded by the second file and the latter is current.

Preferably, the output generated in step (c) takes the form of a graphical display of the structure of the website including representations of the monitored entities visually indicating the relative magnitudes of the number of clients currently associated with each entity. Alternatively, the output generated in step (c) takes the form of a histogram indicating the number of users for each monitored entity.

According to another aspect of the present invention, there is provided a method of monitoring the usage of a website involving the steps of:

associating an identifier with a client visiting the website which identifier is provided to the site by the client with each page request from that client;
at each request by a client for a page of the website, at least where that page is different from a page currently being browsed by the client,:
  generating and storing a current-presence indication indicating that the client, as represented by the client's identifier, is currently browsing that page, and
  removing any prior current-presence indication for that client indicating the client's presence at a different page,
generating from said current-presence indications an output indicating the current distribution of clients across the pages of the website.

BRIEF DESCRIPTION OF THE DRAWINGS

A website usage monitoring method embodying the invention will now be described, by way of non-limiting example, with reference to the accompanying diagrammatic drawings, in which.

BEST MODE OF CARRYING OUT THE INVENTION

Figure 1:
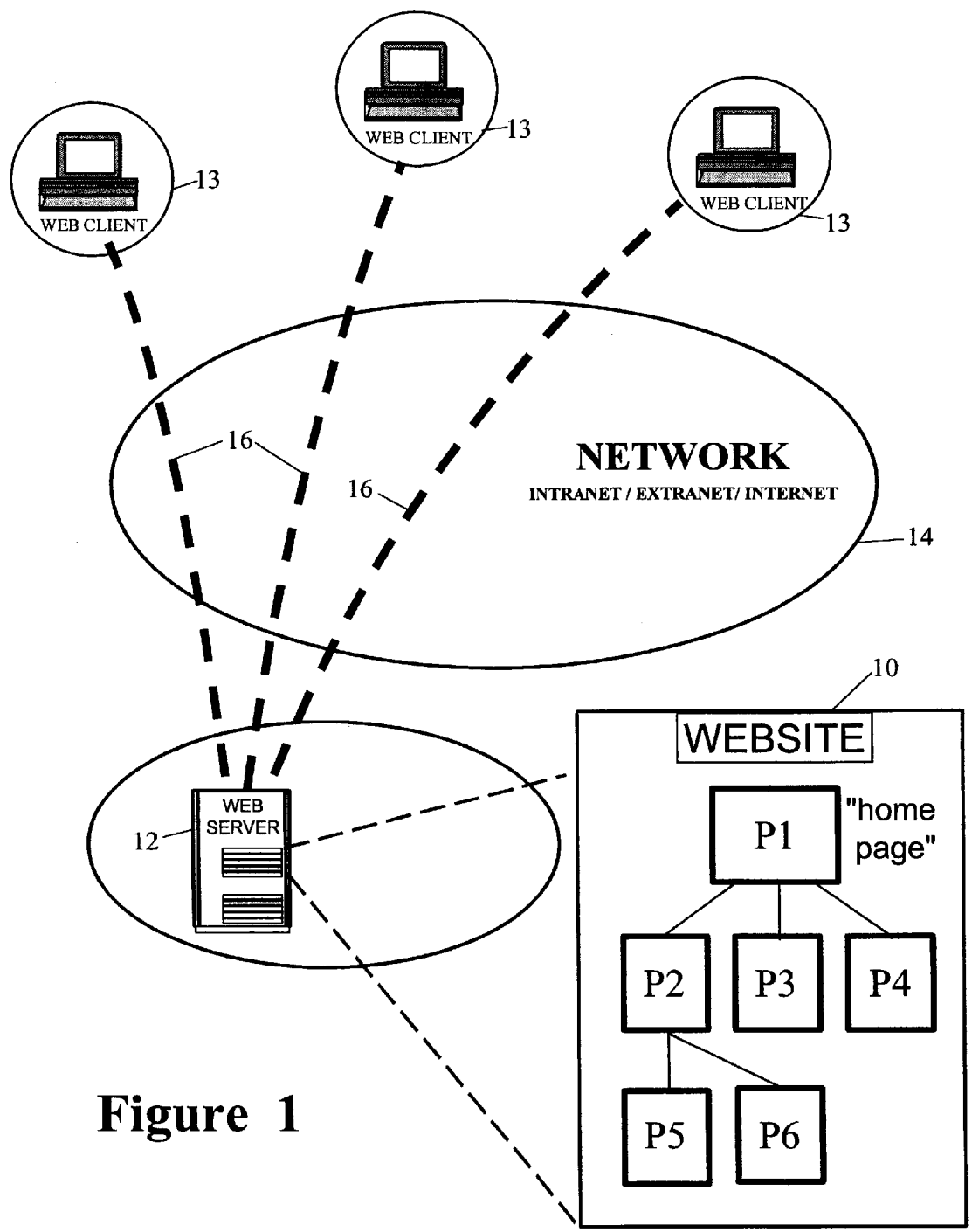
FIG. 1 is a diagram showing a known website arrangement to which the present invention can be applied.
Figure 2:
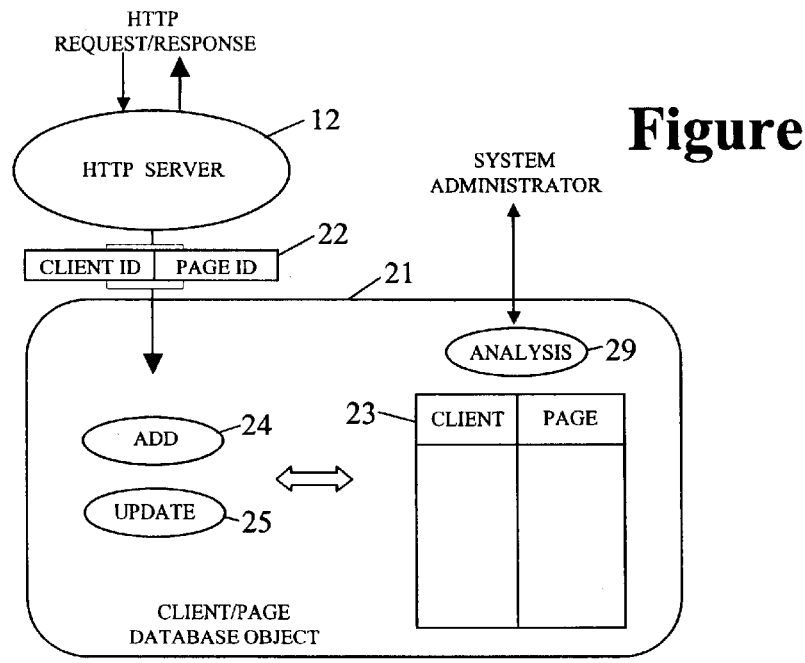
FIG. 2 is a diagram showing the properties and methods of a database object used in a first embodiment of the website usage monitoring method of the invention.

FIG. 2 illustrates the application of a first embodiment of the invention for monitoring usage of the website 10 of FIG. 1; in the present example, the monitoring method is arranged to determine the current distribution of clients across all the pages of the site.

In the FIG. 2 arrangement, the HTTP server 12 is set up to identify with a client ID each client visiting the site during a current session of interaction—examples of how this may be achieved have already been described above with reference to the prior art and any other suitable may also be used.

Each time a page is requested by a client, the server 12 is configured to output a message 22 containing both the client ID of the requesting client and an ID for the requested page. The messages 22 are passed to a database object 21 that forms the main element for implementing the first embodiment of the present invention.

More particularly, database object 21 comprises a table 23 with an entry for each client currently visiting the site, each client entry holding the ID of the client concerned and the ID of the page most recently requested by that client. The table 23 is accessed by three methods 24, 25 and 29 of the database object 21, these methods being:

an "Add" method 24 for adding new entries to the table when a previously unrecorded client is encountered,
an "Update" method 25, for updating the entry for a known client each time a new page is requested by that client, and
an "Analysis" method 29 for periodically analysing the information held in the table 23 to determine a current distribution of clients across the pages of the website.

Whenever a new message 22 is passed to the database object 21 it is received by the update method 25 which first checks to see if there an existing entry in the table 23 for the client identified by the client ID in the message. If there is an existing client entry, the update method 25 updates that entry by replacing the page ID in the entry by that contained in the message 22. If, however, there is no existing client entry, the update method transfers handling of the message to the add method 24 which then adds a new entry to the table 23 for the new client with the client ID and page ID of the new entry being set to those contained in the message 22. In this manner, table 23 indicates for each client the most recently requested page of the website 10; because each page newly requested by a client will generally supersede any previously requested page in the client browser window, it is reasonable to hold that the client is currently located at the last requested page (notwithstanding that the client will normally have cached earlier pages enabling a user to revert to earlier pages without re-contacting the website).

Figure 3:
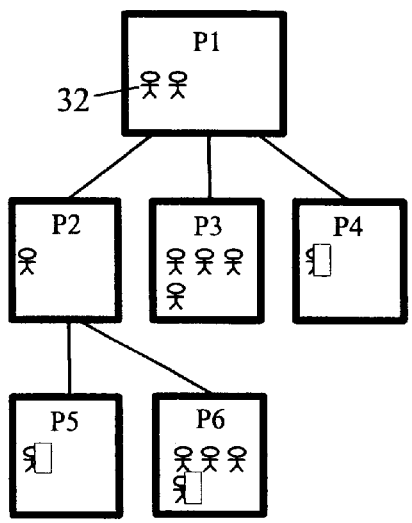
FIG. 3 is a diagram of a first form of output produced by the FIG. 2 embodiment.

Periodically, the analysis method 29 is run to provide a system administrator a view of the current distribution of clients across the pages of the website. In its simplest form, the analysis method simply scans the entries of the table 23 and counts up the number of times each of the pages P1 to P6 appears. The accumulated counts are then output, preferably in a graphical form. FIG. 3 illustrates one form of output in which the analysis method has represented the counts by iconic people placed in a site structure diagram showing the logical organisation of the site pages; in this case, each people icon represents, for example, 100 clients. Thus, for the FIG. 3 example, there are about 400 clients currently visiting page P3 whilst only around 50 clients are currently visiting page P5.

Figure 4:
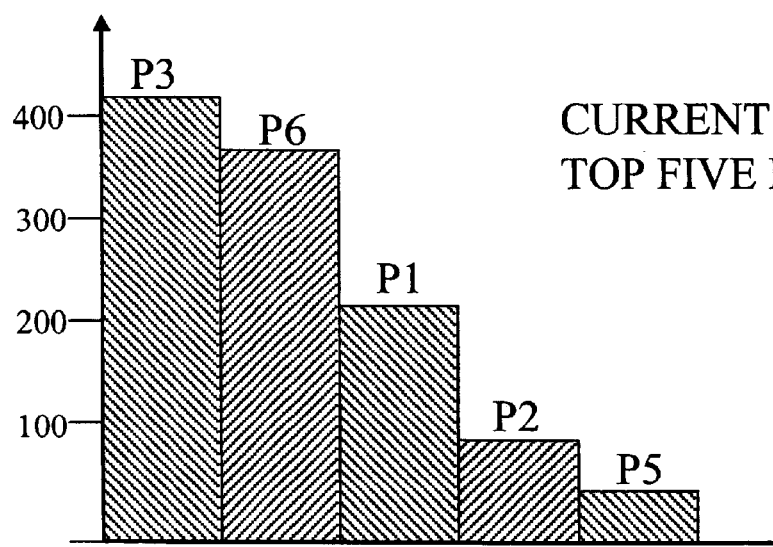
FIG. 4 is a diagram of a second form of output produced by the FIG. 2 embodiment.

FIG. 4 shows another possible form of output from the analysis method; in this example, only the top five most currently-visited pages are depicted, this time in histogram form and in descending order of popularity.

When a client ceases to be interested in the website 10, there will be no indication sent to the site of this unless special mechanisms have been built into the site. Where such mechanisms have not been provided, it is preferable to treat the page last-requested by a client as "current" (or the client as "current" to the site) if the page was requested within a predetermined cut-off time limit. This can be achieved in the case of the FIG. 2 embodiment by time-stamping the messages 22 and holding the timestamp in the corresponding client entry along with the last-requested page ID; when the analysis method 29 is run, any entry having a timestamp older than the cut-off period is then ignored (and preferably deleted). In fact, the same effect can be achieved without the use of timestamps simply by re-initialising the table 23 after each analysis and then collecting data for a period equal to the desired cut-off period before carrying out another analysis. However, this limits the frequency of analysis and it is preferable to use a timestamp to eliminate entries that are too old.

In a variant of the FIG. 2 embodiment, the analysis is effected on an on-going basis by having the add and update methods 24, 25 increment and decrement client counts for each page as appropriate. In this case, the client counts for each page are kept all the time; at each execution of the add method 24, the count for the page concerned is increment whereas at each execution of the update method 25, the count for the page being superseded is decremented and the count for the new page is incremented. The counts may be hot linked into an output display to the give the system administrator a fully up-to-date view of client distribution across the pages of the site. With regard to over-aged entries in table 23, these can be dealt with by automatically running a periodic check of the table (for example, every second) to purge it of such entries—the client counts for pages identified in these entries being appropriately decremented.

Figure 5:
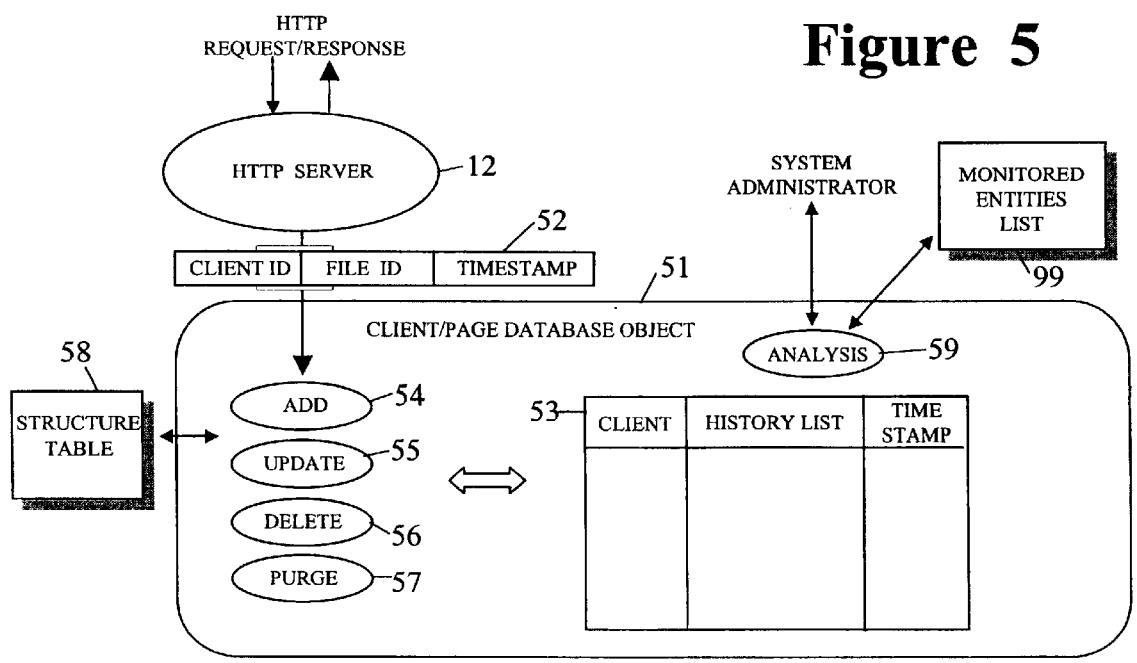
FIG. 5 is a diagram showing the properties and methods of a database object used in a second embodiment of the website usage monitoring method of the invention.

FIG. 5 illustrates a second embodiment of the present invention which can be used for monitoring selected entities of a website where a monitored entity may be any website file downloadable to a web client or a logical or sequential combination of such files. As shown in FIG. 5, a list 99 is maintained of the entities to be monitored, this list specifying for each entity to be monitored, the file, or logical or sequential combination of files, defining the entity. In the simplest case, the monitored entities will be every page file of the website. In other cases, a page of interest may, for example, be linked to two other pages but it is only desired to know when a client arrives at the page of interest via one of the links; this can be achieved by defining a monitored entity in terms of a sequential combination of requested files, namely the selected one of the linking pages followed the page of interest itself. In yet further cases, such as where the website comprises pages composed of frames, it may be of interest to monitor which clients are currently viewing a particular file of interest in one page frame structure but not in another (the file of interest being viewable in both pages); this can be achieved by defining a monitored entity in terms of a logical AND combination of files which must both be current, namely the file of interest and the frame definition file for the relevant page.

In the present embodiment, all monitored entities are required to at least include a page ID identifying the current page or frame-definition file to which the monitored entity relates.

It will be appreciated that with since a monitored entity can now be something other than just a simple page file, it is possible to have multiple monitored entities simultaneously current for the same client (for example, there may be two monitored entities each constituted by a respective file loaded in a different one of the frames of a multi-frame page).

As in the FIG. 2 embodiment, in the FIG. 5 embodiment, the server 12 is arranged to pass a message 52 to a database object 51 each time a client requests a website file. In the present example, the message 52 contains not only the ID of the requesting client and of the requested file, but also a time stamp. The database object 51 includes a table 53 that is similar to the table 23 in that it includes an entry for each current client; however, rather than each entry simply recording the ID of the most-recently requested page, because of the more complex types of monitored entity to be handled each entry keeps a history list of at least the last several files requested including an indication of the frame and/or window in which each file is displayed. Each table entry also stores the timestamp associated with the file most recently requested by the relevant client.

As for the database object 21 of FIG. 2, the database object 51 of FIG. 5 has add, update and analysis methods 54, 55 and 59. However, in addition database object 51 has delete and purge methods 56 and 57. The delete method when invoked simply deletes an entry identified by client ID from the table 51. The purge method 57 when invoked scans the table 57 and deletes entries that have not been updated more recently than a cut-off time.

In operation, when a message 52 is passed to the database object it is handled by the update and add methods 55, 54 in the same manner as effected by the corresponding methods of FIG. 2 with the exception that now the file ID information is added to the history list for the client rather than superseding the previous file ID. Since with pages employing frames it is necessary to know into which frame a requested file is to be loaded in order to generate a history list properly representing the evolution of the client's view of the site, the update and add methods must know something about the structure of the site and its pages. Accordingly, a structure table 58 is provided. When the update or add method adds a file to the history list of a client entry in table 53, it first ascertains from this structure table where the file is to be added into the history list in terms of the frame (or, indeed, window) involved. Where the same file may appear in different places (for example, in different frames) so that the file ID does not uniquely locate the file in the site structure, then reference can also be had to the latest location of the client in the website as indicated by the history list in order resolve the ambiguity (it being assumed that the just-requested file will be one linked to from the file or files current for the client concerned).

Figure 6:
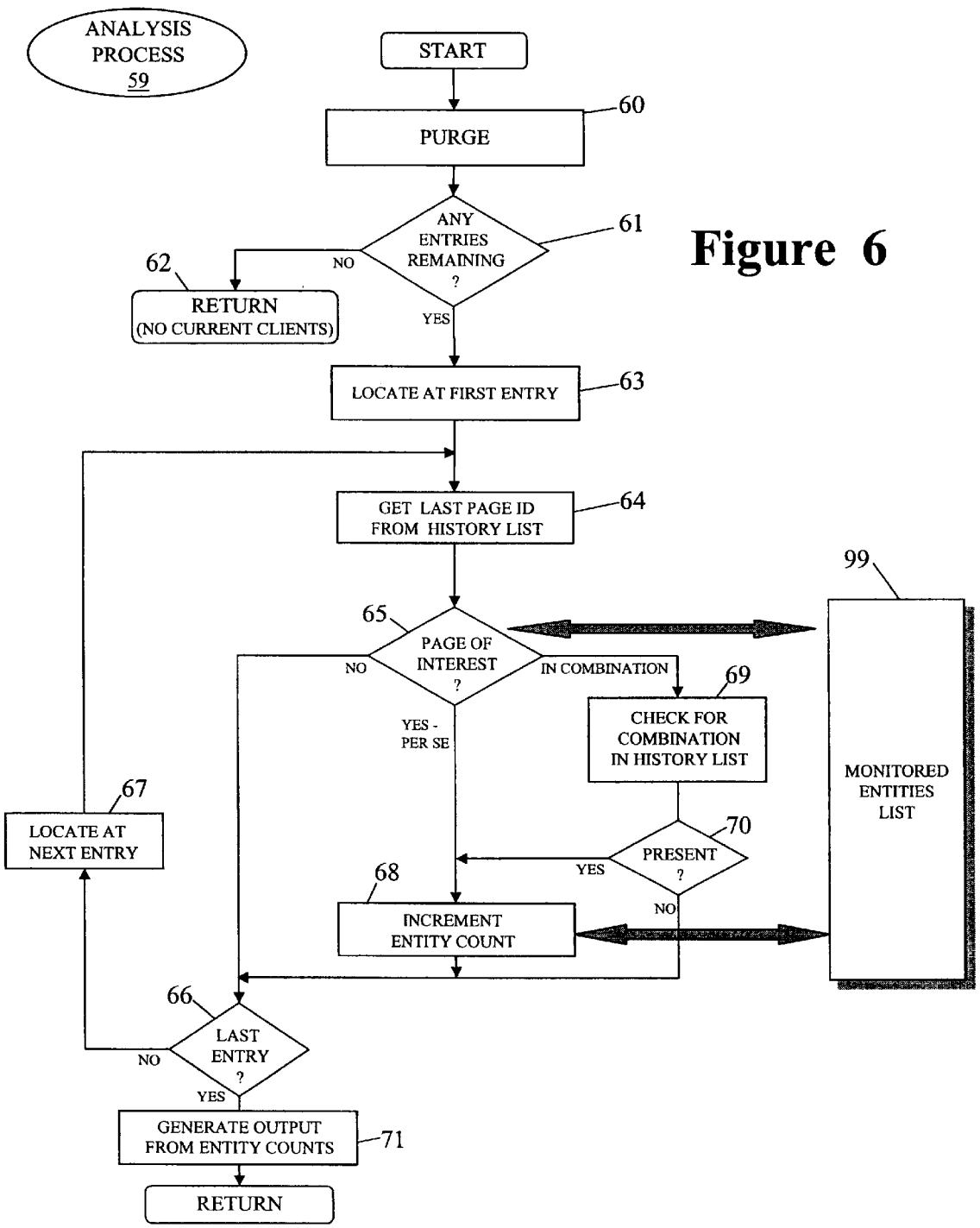
FIG. 6 is a diagram showing an analysis method used in the FIG. 5 embodiment.

FIG. 6 illustrates the analysis method 59 of the FIG. 5 embodiment, this method being run periodically (for example every minute) to generate an updated view of the distribution of current clients across the monitored entities. The first step 60 of this method is to execute the purge method 57 to remove entries from the table 53 which were last updated earlier than a predetermined cutoff period (for example, 5 minutes) prior to running of the purge method as indicated by the entry timestamp. If no entries remain in the table 53 after it has been purged (tested in step 61), the analysis method terminates (step 62) with a message being displayed to the effect that there are no current clients visiting the website. However, if entries remain in the table 53, the analysis method continues by examining the first remaining entry (step 63) to retrieve the last page ID (whole page or frame-definition file for the page) from the history list of that entry (step 64). A check is then made (step 65) against the list of monitored entities 99 to ascertain whether there are any monitored entities which include this page ID. If there are no such monitored entities, a check is made (step 66) as to whether there 6are further entries in the table—if there are, the next entry is examined (step 67) with the analysis method looping to step 64, whereas if no further entries remain, an output step 71 is executed (to be described below) before the analysis method terminates.

Returning to the check made in step 65, if the monitored entity list contains an entity entirely constituted by the page ID being checked, then a count for that entity is incremented (step 68) after which step 66 is executed. If, however, step 65 finds that the page ID of interest forms but one element of a monitored entity defined by a combination of elements, then the history list of the relevant table entry is examined (step 69) to ascertain whether the combination of elements defining the monitored entity is present and current in all its elements (step 70). If the monitored entity is found to be present and current, then its count is incremented (step 68) before passing to step 66; otherwise step 66 is proceeded to directly.

The output step 71 involves generating a graphic output (for example of the form illustrated in FIG. 3 or 4) on the basis of the counts derived for the monitored entities.

With regard to the delete method 56, this is called whenever the web server 12 receives a positive indication that a client has ceased to be interested in the site (for example, through execution of a logoff sequence or by following an offsite link where activation of the latter causes the site to be notified). On detecting such an indication, the server 12 sends an appropriate message to the database object 52 which passes it to the delete method to cause the corresponding entry in the table 53 to be deleted.

It will be appreciated that many variants are possible to the above-described embodiments of the present invention. For example, with respect to the FIG. 5 embodiment, it is possible to dispense with the need for the structure table 58 by the expedient of having the server 12 tag every site-related URL in every file being sent to a client, with the name of the target window or frame for the file identified by the URL. When the URL is returned with a file request to the server 12, it strips off the target window/frame name and passes it to the database object 51 as part of the message 52 thereby avoiding the need for the add/update methods to ascertain this information themselves.

Of course, the current distribution information can be made available not only to the site system administrator but also to clients (end users) to indicate to them the parts of the site found by others to be of the most interest.

What is claimed is:

1. A method of monitoring the usage of a website having a plurality of monitored entities each constituted by a file downloadable to a web client or by a logical or sequential combination of such files, the method involving the steps of:
    (a) associating an identifier with a web client visiting the website which identifier is provided to the site by the web client with each file request from that client;
    (b) monitoring which files are requested by web clients visiting the site and storing currency information that indicates or permits a determination of, for each web client, which monitored entity or entities requested by that client are still current, at a particular point in time, for said-client in terms of not having been superseded by a files or files subsequently requested by that web client;
    (c) generating from said currency information an output indicating, for said particular point in time, a current distribution of web clients across said monitored entities by reference to which of said monitored entities are then current for said clients.

2. A method according to claim 1, wherein step (c) is carried out repeatedly with said particular point in time for each repetition of step (c) being the point in time when that repetition is effected.

3. A method according to claim 1, wherein a said monitored entity requested by a client is no longer treated as being current for that client, notwithstanding that it has not been superseded, when the time elapsed since a request from that client was handled has exceeded a predetermined cut-off value.

4. A method according to claim 1, wherein a said monitored entity requested by a client is no longer treated as being current for that client, notwithstanding that it has not been superseded, when an end-of-interaction indication is received from said client.

5. A method according to claim 4, wherein said end-of-interaction indication is at least one of the following:
    a file request sent by the client to the website for a file not located at the website;
    a user-initiated session termination message;
    a connection termination message.

6. A method according to claim 1, wherein said monitored entities are individual files corresponding to respective pages of the website, said currency information comprising for each said client a client data item including an indication of the last preceding page file requested by that client, and step (c) involving determining whether said last preceding page file is a monitored entity.

7. A method according to claim 1, wherein at least one said monitored entity is defined in terms of a combination of a particular frame-definition file and a predetermined file serving as a source file for a frame defined by said frame-definition file, said currency information comprising for each said client a client data item including a list of the last preceding files requested by that client, and step (c) involving determining from said list whether said at least one monitored entity is current for that client, said at least one monitored entity being treated as current when both said particular frame definition file and said predetermined file are current.

8. A method according to claim 1, wherein at least one said monitored entity is defined in terms of a sequential combination of first and second predetermined files in that order, said currency information comprising for each said client a client data item including a list of the last preceding files requested by that client, and step (c) involving determining from said list whether said at least one monitored entity is current for that client, said at least one monitored entity being treated as current when said first predetermined file has been superseded by said second file and the latter is current.

9. A method according to any one of claims 6, wherein each said client data item includes a timestamp indicating when the last file request was handled for the client concerned, the method involving periodically purging the currency information of all client data items having a timestamp older than a predetermined cut-off time.

10. A method according to claim 9, wherein step (c) is carried out repeatedly with said particular point in time for each repetition of step (c) being the point in time when that repetition is effected, said purging being effected at the commencement of each repetition of step (c).

11. A method according to claim 1, wherein said output generated in step (c) takes the form of a graphical display of the structure of the website including representations of said monitored entities visually indicating the relative magnitudes of the number of clients currently associated with each entity.

12. A method according to claim 7, wherein each said client data item includes a timestamp indicating when the last file request was handled for the client concerned, the method involving periodically purging the currency information of all client data items having a timestamp older than a predetermined cut-off time.

13. A method according to claim 8, wherein each said client data item includes a timestamp indicating when the last file request was handled for the client concerned, the method involving periodically purging the currency information of all client data items having a timestamp older than a predetermined cut-off time.

14. A method of monitoring the usage of a website involving the steps of:
- associating an identifier with a client visiting the website which identifier is provided to the site by the client with each page request from that client;
- at each request by a client for a page of the website, at least where that page is different from a page currently being browsed by the client,:
  - generating and storing a current-presence indication indicating that the client, as represented by the client's identifier, is currently browsing that page, and
  - removing any prior current-presence indication for that client indicating the client's presence at a different page,
- generating from said current-presence indications an output indicating the current distribution of clients across the pages of the website.

* * * * *